United States Patent
McNeill et al.

(10) Patent No.: US 7,543,178 B2
(45) Date of Patent: *Jun. 2, 2009

(54) LOW COST RAID WITH SEAMLESS DISK FAILURE RECOVERY

(75) Inventors: Andrew B. McNeill, Morrisville, NC (US); Thomas H. Newsom, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/057,403

(22) Filed: Mar. 28, 2008

(65) Prior Publication Data

US 2008/0178038 A1   Jul. 24, 2008

Related U.S. Application Data

(62) Division of application No. 10/840,448, filed on May 6, 2004, now Pat. No. 7,409,582.

(51) Int. Cl.
*G06F 11/00* (2006.01)
(52) U.S. Cl. .................................. 714/6; 714/7
(58) Field of Classification Search ........................ None
See application file for complete search history.

(56) References Cited

U.S. PATENT DOCUMENTS

| | | | |
|---|---|---|---|
| 5,278,838 A | 1/1994 | Ng et al. |
| 5,392,290 A | 2/1995 | Brown et al. |
| 5,572,661 A | 11/1996 | Jacobson |
| 5,727,144 A | 3/1998 | Brady et al. |
| 5,893,919 A | 4/1999 | Sarkozy et al. |
| 6,112,255 A | 8/2000 | Dunn et al. |
| 6,138,125 A | 10/2000 | DeMoss |
| 6,223,252 B1 | 4/2001 | Bandera et al. |
| 6,421,767 B1 | 7/2002 | Milillo et al. |
| 6,574,709 B1 | 6/2003 | Skazinski et al. |
| 6,598,174 B1 | 7/2003 | Parks et al. |
| 6,732,233 B2 | 5/2004 | Smith |
| 6,886,108 B2 | 4/2005 | Talagala |
| 6,892,276 B2 | 5/2005 | Chatterjee et al. |
| 2002/0162048 A1 | 10/2002 | Ackaret et al. |
| 2003/0167439 A1 | 9/2003 | Talagala et al. |

(Continued)

OTHER PUBLICATIONS

Chen et al., RAID: High-Performance, Reliable Secondary Storage, Jun. 2, 1994, vol. 26, No. 2, Publisher: ACM Computer Surveys.

(Continued)

*Primary Examiner*—Michael C Maskulinski
(74) *Attorney, Agent, or Firm*—Law Office of Charles W. Peterson, Jr.; Kurt P. Goudy, Esq.

(57) ABSTRACT

A storage subsystem such as an array of disk drives, method of managing disk drives in the storage subsystem and program product therefor. The storage subsystem may be a redundant array of independent disks (RAID) and the individual disks drives may be Self-Monitoring, Analysis and Reporting Technology (SMART) capable drives. When one of the drives gives an indication of an impending failure, a disk image of the failing disk is built on an available spare disk. Once the image is complete, the failing disk may be replaced without down time for rebuilding a failed disk.

11 Claims, 2 Drawing Sheets

U.S. PATENT DOCUMENTS

2005/0166084 A1   7/2005   Yagisawa et al.

OTHER PUBLICATIONS

Copeland et al., A Comparison of High-Availability Media Recovery Techniques, May 1, 1989, pp. 98-109.

M. Chen et al., Optimal Data Allotment to Build High Availability and High Performance Disk Arrays, IBM TDBs, May 1, 1994, pp. 75-79, vol. 37, No. 05, Publisher: IBM.

Wu et al., Reliability Analysis of Disk Array Organizations by Considering Uncorrectable Bit Errors, Proceedings. The Sixteenth Symposium on Reliable Distributed Systems, Oct. 1, 1997, pp. 2-9, Publisher: IEEE Comput. Soc.

LOW COST RAID WITH SEAMLESS DISK FAILURE RECOVERY

CROSS REFERENCE TO RELATED APPLICATION

The present application is a divisional of Ser. No. 10/840,448 U.S. Pat. No. 7,409,582, assigned to the assignee of the present invention.

BACKGROUND OF THE INVENTION

1. Field of the Invention

The present invention is related to a mass storage device and more particularly to failure recovery and data regeneration during failure recovery in disk arrays.

2. Background Description

An array of disks, and in particular a disk array referred to as a Redundant Array of Independent Disk (RAID) are well known in the art. Disk arrays such as RAIDs increase data availability and storage capacity, to improve system performance and flexibility, and for improved data protection. Drives may be grouped within the RAID and normally, the drives are aggregated and appear as a single storage device to a host data processing system.

When one disk of the RAID fails, data from that failed disk must be regenerated, e.g., rebuilt using error correction information from the remaining disks in the group. Typically the regenerated data is written to a new, replacement disk. Many RAID systems support what is known as hot sparing, where a spare drive is included (e.g., within the drive group) for temporarily swapping for a failed disk drive. The hot spare drive provides a temporary patch and holds regenerated data until the failed disk drive is physically replaced. Then, the regenerated data is transferred to the replacement disk and the spare disk is freed for subsequent hot sparing.

Consumer product type disk drives, e.g., Parallel ATA (PATA) and Serial ATA (SATA), are used to reduce overall cost of lower cost RAIDs. While using these relatively cheap drives reduces RAID cost, these cheaper drives fail more frequently and increase the risk of losing data. As the number of independent drives in a particular RAID increases, the likelihood of a drive failing increases linearly with the number of drives. RAID algorithms that protect against data loss from a single failing disk can mitigate the effects of a single disk failure. Another approach is to create exact copies of data on multiple disks, also known as data mirroring. Data mirroring has increased data safety, but at the cost of significantly reduced RAID storage capacity, i.e., reduced by a factor equivalent to the number of copies. Various encoding schemes have been used to reduce the redundancy required for data protection and, thereby, increase RAID storage capacity. These typical solutions not only increase RAID cost, perhaps to completely offset any cost reduction from using cheaper drives and, further, impair RAID performance. Additionally, these cheaper drives have high enough failure rates that a second disk may fail before a first failing drive is replaced and rebuilt. A double disk fail in a typical low cost RAID, very likely, could not be recovered.

Thus, there is a need for a low cost, transparent failure recovery mechanism that reduces the window of vulnerability to data loss in RAIDs.

SUMMARY OF THE INVENTION

It is a purpose of the invention to improve storage subsystem data availability;

It is another purpose of the invention to improve data availability in low cost redundant array of independent disks (RAID);

It is yet another purpose of the invention to seamlessly recover from disk failures in low cost RAIDs, while minimizing the risk of user down time;

It is yet another purpose of the invention to minimize the risk of data loss from multiple disk failures in low cost RAIDs.

The present invention relates to a storage subsystem such as an array of disk drives, method of managing disk drives in the storage subsystem and program product therefor. The storage subsystem may be a redundant array of independent disks (RAID) and the individual disks drives may be Self-Monitoring, Analysis and Reporting Technology (SMART) capable drives. When one of the drives gives an indication of an impending failure, a disk image of the failing disk is built on an available spare disk. Once the image is complete, the failing disk may be replaced without down time for rebuilding a failed disk.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
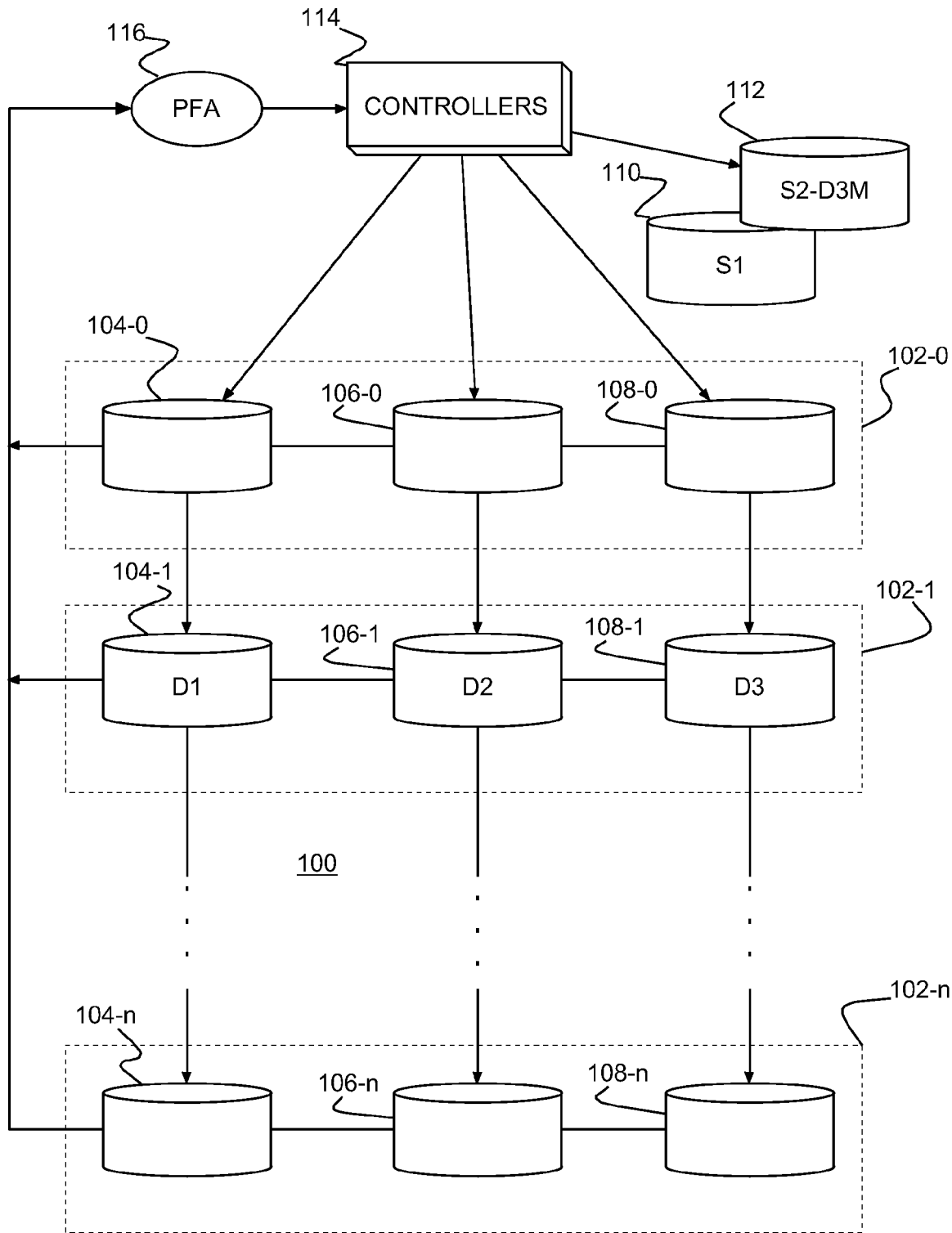
FIG. 1 shows an example of a disk array subsystem according to the present invention, wherein ailing drives are mirrored before failure to minimize the risk of down time and time to recover from device failures.

FIG. 1 shows an example of a preferred disk array subsystem 100 according to the present invention. The disk array subsystem 100 may be a Redundant Array of Independent Disk (RAID), e.g., a RAID level 5, wherein saving the contents of ailing drives (e.g., mirroring) begins before failure to minimize the risk of data loss, down time and time to recover from device failures. It should be noted that the disk array subsystem 100 example of FIG. 1 is not intended to be restricted to any particular such array or RAID and is shown for example only. Further, disk, disk drive and drive are used interchangeably herein for the same unit unless indicated otherwise. The present invention has application to any disk array, wherein at least one of the disks includes a failure prediction capability. In particular, the present invention has application to a RAID of low cost consumer product type disk drives, e.g., Parallel ATA (PATA) and Serial ATA (SATA) and, more particularly, of Self-Monitoring, Analysis and Reporting Technology (SMART) drives. However, any suitable type of disk drive may be used in a preferred embodiment RAID.

The array subsystem 100 of this example includes a number of groups 102-0, 102-1, . . . , 102-n of devices, e.g., independent disks 104-0, 106-0, 108-0, 104-1, 106-1, 108-1, . . . , 104-n, 106-n, 108-n, where n is any suitable number of independent disks (e.g., 3 or more) and at least one spare device or drive 110, 112, two in this example. Device control is provided by one or more controllers 114 that might be a suitably modified state of the art RAID controller, preferably in firmware. Preferred embodiment controller(s) 114 (referred to as a single controller hereinbelow for simplicity of description) provide another level of protection that reduces the risk of failure and further minimizes the length of time that a preferred drive array 100 may be forced into degraded operation for recovery. A failure prediction facility 116 monitors devices for impending failures and provides the controller 114 with an indication of any such impending failure. Upon an indication from the failure prediction facility 116 that a disk (e.g., 108-1) may soon fail, the controller 114 initiates mirroring on one of the spare drives, e.g., 112. Further, that spare 112 continues to mirror the ailing drive 108-1 until it fails or, the spare 112 contains a complete and current copy of the ailing drive 108-1.

Since at the controller 114 error rates may appear high because of influences from other sources, a preferred failure prediction facility 116 is distributed amongst the drives with each drive monitoring itself and providing an indication of its health to the controller 114. For example, many consumer product ("off the shelf") disks can perform a Predictive Failure Analysis (PFA, well known in the art) of collected error information of disk operation and in particular, are SMART capable. SMART capable or PFA enabled drives monitor specific operating characteristics that may precede a disk failure and provide a better fail indicator than the controller 114 normally collects. SMART drives may take periodic internal measurements, for example, of various magnetic parameters of the drive head and disk, head fly height on all data surfaces, channel noise, signal coherence, signal amplitude, writing parameters, etc. Further, SMART capable or PFA-enabled drives may analyze drive parameter history to detect data exceeding thresholds that indicate impending device failure. The history of these parameters may be analyzed periodically (generally during idle periods) and may include the output of data, non-data, and motor start error recovery logs generated, e.g., by ECC circuitry or, other logs of soft error rates.

Multiple failing drives can be repaired simultaneously, i.e., one for each spare drive 110, 112. So if, before the first failing drive 108-1 is mirrored and replaced, another drive (e.g., 104-2) indicates that a failure is likely, an image of that second drive 104-2 can be built on any other available spare drive, e.g., 110. Similarly, if a drive (e.g., 104-0) fails before the first failing drive 108-1 is mirrored and replaced, that drive 104-0 is hot spared with an unoccupied spare, e.g., 110. For this second, hard fail, recovery can begin immediately, rebuilding the failed drive 104-0 from error correction information on other drives in the array, even as spare drive 112 continues mirroring the first ailing drive 108-1.

Figure 2:
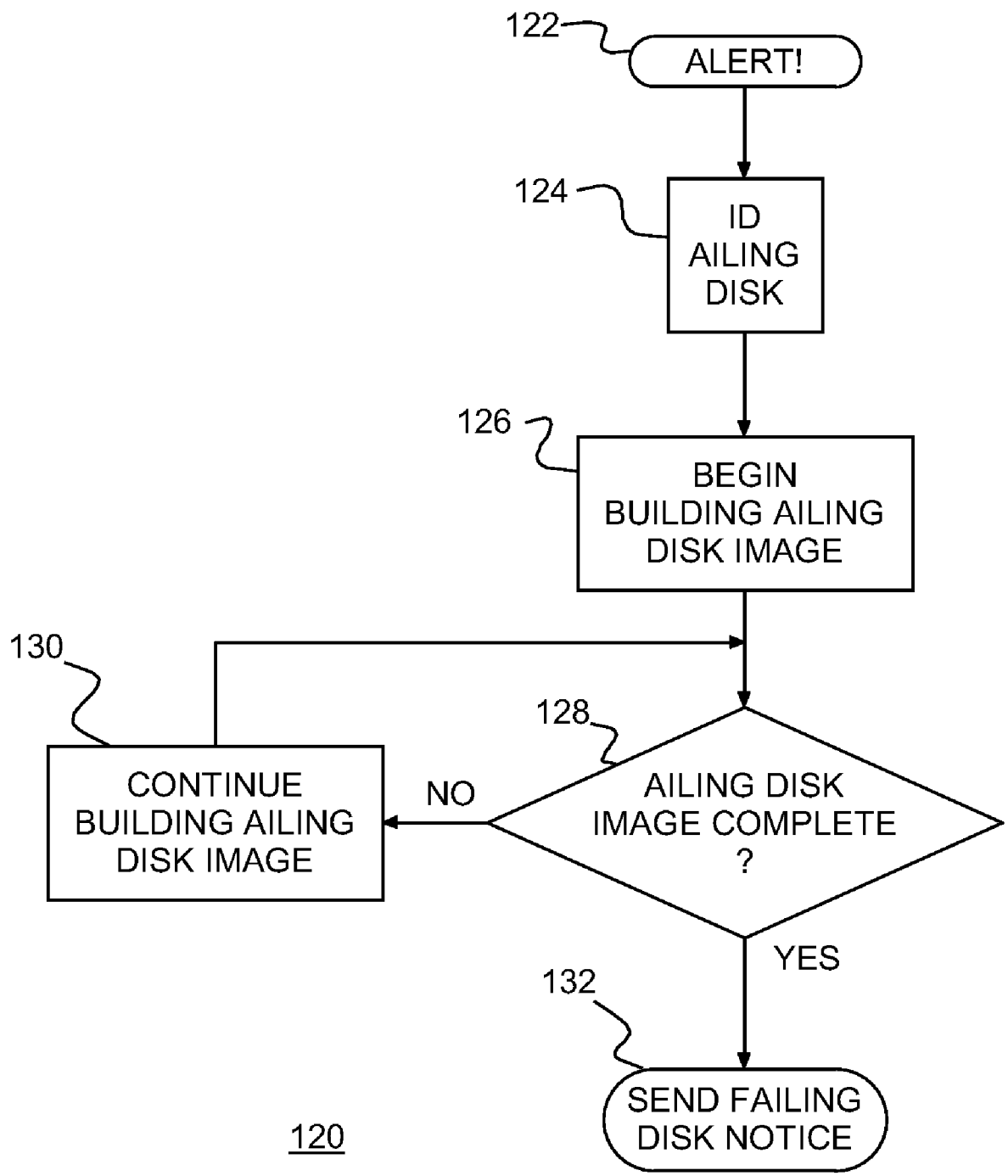
FIG. 2 shows a flow diagram example of how ailing independent disks are seamlessly replaced on the fly, e.g., mirrored to a spare disk.

FIG. 2 shows a flow diagram example 120 of how ailing independent disks (e.g., 108-1 of FIG. 1) in a preferred embodiment array 100 are seamlessly replaced on the fly according to the present invention, i.e., mirrored to spare disk 112 and replaced once the disk image is complete or the ailing drive fails. Beginning in step 122, whenever the failure prediction facility 116 identifies that a drive (108-1 in this example) has started having problems, the failure prediction facility 116 issues an alert to the controller 114. The controller 114 responds in step 126 by initiating an image build of the identified ailing drive 108-1 to the spare, 112 in this example. So, for this simple example the controller 114 selects one spare disk 112 as a "crutch" for pairing with the identified ailing drive 108-1, effectively forming a RAID 1 mirror. Of course it is understood that the RAID 1 mirror of this example is for example only and other RAID level configurations may be implemented for more elaborate protection.

Mirroring begins building a copy of the image on the crutch drive 112 and in step 128 as long as a complete copy has not been completed, then in step 130 mirroring continues. It is entirely possible that an ailing drive will fail before the image is complete. However, regardless of when the ailing drive 108-1 actually fails, at least part of it is mirrored to the crutch drive 112 and, frequently for sufficiently predictive failure prediction facility 116, a complete mirrored copy may be built in step 128 before the ailing drive 108-1 actually fails. After the drive image is complete, a notice is sent in step 132, e.g., to the user or system administrator, that the ailing drive 108-1 is failing. Similarly, such a notice is sent upon failure of the ailing drive and before image completion. If the image completes before failure, both drives 108-1, 112 continue as a mirrored pair and in service until the failing drive 108-1 is replaced or fails. Thereafter, the failing disk 108-1 is replaced in such away as to minimize down time. So, the failing disk image may be transferred to the replacement drive from the crutch drive 112, which is freed for subsequent use. Typically, however, the failing disk 108-1 is removed and permanently replaced logically with the crutch drive 112; a new drive is inserted, physically, in place of failed drive 108-1; and, the new disk logically replaces disk 112, i.e., becomes an available spare disk 112.

Advantageously, upon failure of the ailing disk 108-1 the crutch drive 112 takes over. So, the exposure to array down time and data loss is minimized even for a second coincidental disk failure, because every disk failure does not force the array, temporarily, into degraded operation as was previously experienced during RAID recovery. Additionally, users of a preferred embodiment RAID infrequently experience degraded operation for a single disk failure because the ailing drive 108-1 may be replaced before it actually fails. Typically, a preferred embodiment RAID provides a failure notification before an actual failure and after rebuilding the ailing drive 108-1. As a result, the ailing drive 108-1 may be replaced at any time after the mirrored copy is completed on the crutch drive 112. Thus, even if another drive (e.g., 106-0) fails before the mirrored copy is built onto the crutch drive 112, a preferred embodiment RAID still avoids data loss on one or both of the failing drives 106-0, 108-1 that might otherwise result. Instead of losing performance for as much as several hours rebuilding from each failure, recovery from a predictable failure is seamless or facilitated by the mirrored portion of the image. Further, the risk of disastrous data loss from a second, unexpected failure is reduced and, only requires rebuilding data on that second drive as was previously necessary for every drive failure.

While the invention has been described in terms of preferred embodiments, those skilled in the art will recognize that the invention can be practiced with modification within the spirit and scope of the appended claims.

What is claimed is:

1. A computer program product for managing disk drives in an array of disk drives, said computer program product comprising a computer usable medium having computer readable program code thereon, said computer readable program code comprising:

computer readable program code means for receiving indications of potential disk drive failures from an array of disk drives;

computer readable program code means for identifying ailing drives responsive to said indications;

computer readable program code means for mirroring said ailing drives to spare drives and continuing mirroring after replicating said ailing drive on said spare drive, disk images of identified said ailing drives being built responsive to identification each of said drives is ailing; and computer readable program code means for providing an indication that mirrored said ailing drives are failing.

2. A computer program product for managing disk drives in an array of disk drives as in claim 1, wherein said computer readable program code means for building disk images comprises:
- computer readable program code means for identifying an available one of said spare drives as a crutch drive; and
- computer readable program code means for mirroring an identified one of said ailing drives to said crutch drive, whereby mirrored drives seamlessly replace ailing drives on the fly.

3. A computer program product for managing disk drives in an array of disk drives as in claim 2, wherein said indications of potential disk drive failures are predictive failure analysis (PFA) results collected from said array of disk drives.

4. A computer program product for managing disk drives in an array of disk drives as in claim 3, wherein said array of disk drives is a redundant array of independent disks (RAID), each of said disk drives being an Advanced Technology Attachment (ATA) drive with Self Monitoring, Analysis and Reporting Technology (SMART) capability collecting and providing said PFA results.

5. A computer program product for managing disk drives in an array of disk drives as in claim 2, further comprising:
- computer readable program code means for logically replacing a failed drive with a replacement drive and discontinuing mirroring, the replacement drive being identified as an available spare drive, whereby said ailing drives are seamlessly replaced on the fly.

6. A storage subsystem comprising:
- an array of Advanced Technology Attachment (ATA) disk drives, ones of said array of ATA disk drives being identified as spare drives;
- a failure prediction facility monitoring said array of ATA disk drives for an indication of an impending disk failure, said failure prediction providing an ailing disk indication for each ailing disk identified by said indication of an impending disk failure; and
- at least one disk drive controller controlling disk drive selection, said at least one disk drive controller receiving ailing disk indications and selectively designating one of said spare drives as a crutch drive for each of said ailing disk indications, said at least one controller automatically mirroring a respective said ailing drive to a corresponding said crutch drive, mirroring continuing after replicating said ailing drive on said spare drive, wherein a disk image is built for identified ailing disk drives on each said corresponding crutch drive.

7. A storage subsystem as in claim 6, wherein said at least one controller provides an indication that said ailing drive is failing when each said disk image is complete, whereby mirrored drives are automatically built and seamlessly replace ailing drives on the fly.

8. A storage subsystem as in claim 7, wherein said array of ATA disk drives is a redundant array of independent disks (RAID) and said failure prediction facility collects predictive failure analysis (PFA) results from said plurality of ATA disk drives.

9. A storage subsystem as in claim 8, wherein each of said ATA disk drives is a Self-Monitoring, Analysis and Reporting Technology (SMART) capable drive providing said PFA results.

10. A storage subsystem as in claim 9, wherein each said corresponding crutch drive forms a RAID 1 mirror with said respective ailing drive.

11. A storage subsystem as in claim 7, wherein said at least one controller logically replaces failed drives with replacement drives, each replacement drive being identified as an available spare drive.

* * * * *